United States Patent Office 3,792,082
Patented Feb. 12, 1974

3,792,082
ESTERS OF HALOPHENOXYISOBUTYRIC ACID AND HYDROXY-ALIPHATIC ACID DERIVATIVES
Joseph Nordmann, Paris, Georges Dominique Mattioda, Enghein-les-Bains, and Gerard Paul Marie Henri Loiseau, Sceaux, France, assignors to Ugine Kuhlmann, Paris, France
No Drawing. Continuation of abandoned application Ser. No. 838,657, July 2, 1969. This application Aug. 11, 1972, Ser. No. 280,035
Claims priority, application France, July 11, 1968, 158,839; Dec. 24, 1968, 180,371; Dec. 30, 1968 181,928
Int. Cl. C07c 69/76
U.S. Cl. 260—473 G       4 Claims

ABSTRACT OF THE DISCLOSURE

This invention relates to medicaments having the general formula:

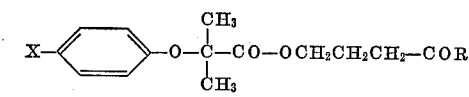

in which X represents a halogen atom and R represents an alkoxy or arylalkoxy group or a mono- or di-substituted amino group, the di-substitution possibly being in the form of a ring, which medicaments have hypocholesterolemiant properties; to compositions comprising such compounds and to a process for the treatment of hypocholesterolemia.

---

The present application is a continuation of copending application, Ser. No. 838,657, filed July 2, 1969, now abandoned.

The present invention relates to new medicaments with hypocholesterolemiant properties.

The new medicaments have the general formula:

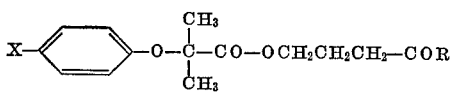

in which X represents a halogen atom and R represents an alkoxy or arylalkoxy group or a mono- or di-substituted amino group, the disubstitution possibly being in the form of a ring.

The residue R may be, for example, a methoxy, ethoxy, propoxy, benzyloxy, methylamino, ethylamino, isopropylamino, cyclohexylamino, benzylamino, dimethylamino, diethylamino, dipropylamino, morpholino, piperidino, or pyrrolidinyl-1 group. The substituent X may be fluorine, chlorine, bromine or iodine.

The esters and amides of the above formula may be obtained for example by conventional methods. A convenient method for the synthesis of the esters comprises condensing a potassium 4-halo-phenoxy-isobutyrate with an alkyl or aralkyl 4-halo-butyrate in a solvent with a high boiling point, preferably an organic solvent having a boiling point between 100° C. and 200° C. such as, for example, dimethylformamide, dimethylsulphoxide, hexamethylphosphoryltriamide, and in the presence of potassium iodide. For the synthesis of the amides a halide of 4-halo-phenoxyisobutyric acid may be reacted with an N-substituted 4-hydroxy-butyramide prepared by the general method of Reppe (Annalen, 596, 188–228). Another method which can be used comprises trans-esterifying lower alkyl esters, preferably a methyl or ethyl ester, of 4-halo-phenoxyisobutyric acids by the same 4-hydroxy-butyramides.

In the following examples which are purely illustrative and to which the invention is not limited the parts are parts by weight unless the contrary is indicated. The products thus obtained have not yet been described in the chemical literature.

EXAMPLE 1

3-(ethoxycarbonyl)-propyl 4'-chloro-phenoxyisobutyrate 100 parts of dry potassium 4'-chloro-phenoxyisobutyrate are reacted with 39 parts of ethyl 4-chlorobutyrate in the presence of 3 parts of potassium iodide in 100 parts by volume of dry dimethyl formamide. The mixture is heated at 155° C. with stirring for 24 hours. After treatment with water and extraction with ether, the ethereal solution is dried and evaporated. The required product solidifies. It is recrystallized from iso-octane. Yield 65%. It is a white solid of M.P. 43° C. (Maquenne), soluble in ether and in lipids and insoluble in water.

Elementary analysis for $C_{16}H_{21}ClO_5$.—Calculated (percent): C, 58.44; H, 6.43; Cl, 10.79. Found (percent): C, 58.76; H, 6.18; Cl, 10.78.

EXAMPLE 2

3-(ethoxycarbonyl)-propyl 4'-bromo-phenoxyisobutyrate

The procedure is as in Example 1, but 100 parts of potassium 4'-bromo-phenoxyisobutyrate and 35 parts of ethyl 4-chlorobutyrate are used. 65 parts of the desired product are obtained (yield: 70%) which crystallizes in iso-octane. M.P. (Maquenne): 42° C.

Elementary analysis for $C_{16}H_{21}BrO_5$.—Calculated (percent): C, 51.22; H, 5.67; Br, 21.40. Found (percent): C, 51.38; H, 5.29; Br, 21.40.

EXAMPLE 3

3-(benzyloxycarbonyl)-propyl 4'-chlorophenoxy isobutyrate

The procedure is as in Example 1, but 67 parts of potassium 4'-chloro-phenoxy-isobutyrate and 36 parts of benzyl 4-chloro-butyrate are used in 80 parts by volume of dimethyl formamide and in the presence of 2.3 parts of potassium iodide. 38 parts of the desired product are obtained (yield: 57%). It crystallizes in an iso-octane-ethyl ether mixture. M.P. (Maquenne): 37° C.

Elementary analysis for $C_{21}H_{23}O_5Cl$.—Calculated (percent): C, 64.52; H, 5.94; Cl, 9.10. Found (percent): C, 64.90; H, 5.53; Cl, 9.23.

EXAMPLE 4

3-(N-isopropyl-carbamoyl)-propyl 4'-chlorophenoxy isobutyrate 41 parts of 4'-chloro-phenoxy-isobutyryl chloride are introduced at 0° C. into a solution of 28 parts of 4-hydroxy-N-isopropylbutyramide in 300 parts by volume of tetrahydrofuran in the presence of 18.4 parts of triethylamine. The mixture is maintained at the ambient temperature with stirring for 12 hours, the triethylamine hydrochloride obtained is filtered off and washed in tetrahydrofuran, then the solution is concentrated until an oil which crystallizes is obtained. 36 parts of the desired product are obtained (yield: 60%). It is recrystallized from ethyl ether. M.P. (Maquenne): 71° C.

Analysis for $C_{17}H_{24}NO_4Cl$.—Calculated (percent): C, 59.73; H, 7.07; N, 4.09. Found (percent): C, 59.92; H, 7.22; N, 3.72.

EXAMPLE 5

3-(N-cyclohexyl-carbamoyl)-propyl 4'-chlorophenoxy-isobutyrate

The procedure is as in Example 4, but 33.4 parts of 4-hydroxy-N-cyclohexylbutyramide are used. 37 parts (yield: 60%) of the desired product are obtained which is recrystallized from isopropyl ether. M.P. (Maquenne): 59° C.

Analysis for $C_{20}H_{28}NO_4Cl$.—Calculated (percent): C, 62.90; H, 7.38; N, 3.66. Found (percent): C, 63.20; H, 6.95; N, 3.35.

EXAMPLE 6

3-(N-cyclohexyl-carbamoyl)-propyl 4'-bromo-phenoxyisobutyrate

The procedure is as in Example 4, but 49 parts of 4'-bromo-phenoxyisobutyryl chloride and 33.4 parts of 4-hydroxy-N-cyclohexylbutyramide are used. 42 parts of the desired product are obtained (yield: 61%) which is recrystallized from isooctane. M.P. (Maquenne): 78° C.

Analysis for $C_{20}H_{28}NO_4Br$.—Calculated (percent): C, 56.27; H, 6.56; N, 3.29. Found (percent): C, 56.44; H, 6.45; N, 3.32.

EXAMPLE 7

3-(morpholino-carbonyl)-propyl 4'-chloro-phenoxy-isobutyrate 48.5 parts of ethyl 4'-chloro-phenoxyisobutyrate obtained by the Julia process (Bull. Soc. Chim., 1956, 776–83) are dissolved in 200 parts by volume of dry toluene in the presence of 34.5 parts of 4'-hydroxybutyryl-morpholine and 2 parts of aluminium isopropylate. The mixture is heated for 8 hours, the azeotrope toluene-ethanol being collected. The product is filtered and the volatile products are distilled by heating up to 200° C. under 0.2 torr pressure. The desired product crystallizes on cooling and is recrystallized from isopropyl ether. M.P. (Maquenne): 66° C.

Analysis for $C_{18}H_{24}ClNO_5$.—Calculated (percent): C, 58.46; H, 7.79; N, 3.79. Found (percent): C, 58.22; H, 7.61; N, 3.57.

EXAMPLE 8

3-(dimethylaminocarbonyl)-propyl 4'-chloro-phenoxy isobutyrate 55 parts of the chloride of 4-chloro-phenoxyisobutyric acid are slowly introduced, while maintaining the temperature at 0° C., into 30 parts of 4-hydroxy-N,N-dimethylbutyramide dissolved in 360 parts by volume of dry tetrahydrofuran in the presence of 24 parts of triethylamine, in an apparatus provided with a mechancal stirrer and protected from humidity. The temperature is allowed to rise and the product is stirred for 2 hours at the ambient temperature. The triethylamine hydrochloride formed is filtered off and washed with tetrahydrofuran. The filtrate is concentrated by distilling in vacuo and the oil obtained is distilled. 51 parts of 3-(dimethylaminocarbonyl)-propyl 4'-chloro-phenoxyisobutyrate are obtained as a slightly yellow thick liquid, of boiling point 192° C. at 0.8 mm. Hg. Rectification gives a product of boiling point 200–202° C. under 1 mm. of Hg, of which the purity by gas chromatography is over 99%. Yield: 68%.

Elementary analysis for $C_{16}H_{22}NO_4Cl$. — Calculated (percent): C, 58.62; H, 6.77; N, 4.27. Found (percent): C, 58.25; H, 6.31; N, 4.66.

The 4-hydroxy-N,N-dimethylbutyramide used in this example is prepared by the method of Reppe (Annalen, 596, 188–228) by condensing γ-butyrolactone with dimethylamine as follows: 100 parts of dimethylamine and 94 parts of γ-butyrolactone dissolved in 360 parts by volume of absolute ethyl alcohol are introduced into an apparatus provided with a stirring device and a reflux condenser. The reaction is exothermic and must be controlled by cooling. The product is then left overnight at the ambient temperature, then heated under reflux for 8 hours. The alcohol is removed by distillation under atmospheric pressure and the amide is distilled in vacuum. This is colorless liquid of boiling point 135° C. under 1 mm. of Hg (or 170° C. under 20 mm. Hg). Weight obtained: 129 parts. Yield: 91%.

EXAMPLE 9

3-(dimethylaminocarbonyl)-propyl 4'-chlorophenoxy-isobutyrate 48.5 parts of ethyl 4' - chloro-phenoxyisobutyrate are dissolved in 200 parts by volume of dry toluene in the presence of 26.2 parts of 4-hydroxy-N,N-dimethyl butyramide and 2 parts of aluminium isopropylate. The solution is heated for 8 hours, while collecting the toluene-ethanol azeotrope, in an apparatus provided with a distillation column at a controllable rate of reflux. After this it is filtered, the solvent is evaporated in vacuo and the residue is distilled. An almost colorless, slightly yellow oil is obtained, the purity of which by chromatographic examination in the gaseous phase is of the order of 99.5%. Its boiling point is 175° C. under 0.1 torr.

This oil is kept supercooled at the ambient temperature. Crystallization may be obtained by cooling or by seeding with crystals of the product. The melting point is 34° C. (instantaneous on the Maquenne block).

The product can be recrystallized. For this, it is dissolved, for example, at the ambient temperature in petrol ether, ethyl ether or isopropyl ether, and this solution is cooled to about −50° C. while stirring. After drying over sulphuric acid under vacuum, white needles of very great purity are thus obtained.

Analysis for $C_{16}H_{22}ClNO_4$.—Calculated (percent): C, 58.62; H, 6.77; N, 4.27; Cl, 10.85. Found (percent): C, 58.62; H, 6.47; N, 4.37; Cl, 10.60.

Crystallization is promoted by adding some needles of the product to the oily liquid obtained in the first paragraph of Example 8 or by cooling this liquid under the conditions indicated above.

TOXICOLOGICAL PROPERTIES

The products of which the general formula is given above are administered orally to Swiss albino mice. Under these conditions, the lethal doses per kg. of the animal's weight are as follows:

| | | | $LD_{50}$, mg./kg. | |
|---|---|---|---|---|
| X | R | Carrier | Cumulative quantal method | Litchfield and Wilcoxon method, P=0.05 |
| Cl | Isopropyl-amino. | 10% gum solution. | ca. 3, 220 | <2,450 <br> <4,750 |
| Cl | Cyclohexyl-amino. | do | ca. 3, 565 | <3,350 <br> <6,800 |
| Br | Ethoxy | do | ca. 3, 810 | <2,900 <br> <4,300 |
| Cl | do | do | >5,100 | |
| Cl | Benzyloxy | do | ca. 3, 580 | <2,500 <br> <4,650 |

At the toxic doses the symptomatology in the 2 hours which follow the administration of the products is shown by a spasmophilia, a bradypnea and a cyanosis.

The 3 - (dimethylaminocarbonyl)-propyl 4' - chlorophenoxy-isobutyrate, administered orally to the Swiss albino mice, shows a maximal non-toxic dose of 1 g. per kg. of the weight of the animal. Its lethal dose 50 is 1.90 g. per kg. of animal weight and its lethal dose 100 is 3 g. per kg. of animal weight.

PHARMACOLOGICAL PROPERTIES

The hypocholesterolemiant activity of the products according to the invention has been determined on rats of Sprague Dawley stock (male animals of weight 200 to 250 g.). These rats were fed normally and the cholesterolemia was determined before administering the product, then a week after administering the product. The rats were treated daily with oral doses of 100 and 400 mg. per kg. of animal weight, the product being suspended in a mixture of 10% gum arabic.

The cholesterol was determined by the Watson method (Clin. Chim. Acta, 1960, 5, 637), which enables the cholesterol to be determined from 20 mm.³ of serum or plasma without deproteinization.

The following results were thus obtained. In the various tables $\overline{X}TE$ signifies the average amount of cholesterol of the group of control animals, $\overline{X}TR$ signifies the average amount of cholesterol of the group of treated animals, the sign + indicates a significant difference and the sign ++ indicates a highly significant difference.

(a) 3 - N-isopropyl-carbamoyl)-propyl 4'-chlorophenoxy-isobutyrate:

| Product | Total amount of cholesterol, g./l. of serum | Difference between averages, $\overline{X}TE-\overline{X}TR$ | Amount of decrease TD, percent equals $\dfrac{\overline{X}TE-\overline{X}TR}{\overline{X}TE} \times 100$ |
|---|---|---|---|
| Absolute control tests (gum water). | 0.79 (0.58–1.03) | | |
| Product of the invention: | | | |
| 100 mg./kg | 0.56 (0.45–0.66) | 0.23++ | 29 |
| 400 mg./kg | 0.38 (0.34–0.48) | 0.41++ | 52 |

(b) 3 - (N-cyclohexyl-carbamoyl)-propyl 4'-chlorophenoxy-isobutyrate:

| Product | Total amount of cholesterol, g./l. of serum | Difference between averages $\overline{X}TE-\overline{X}TR$ | Amount of decrease D, percent |
|---|---|---|---|
| Absolute control tests (gum water) | 0.79 (0.58–1.03) | | |
| Product of the invention: | | | |
| 100 mg./kg | 0.66 (0.53–0.92) | 0.13+ | 16 |
| 400 mg./kg | 0.46 (0.40–0.55) | 0.33++ | 42 |

(c) 3 - (benzyloxycarbonyl)-propyl 4'-chloro-phenoxy-isobutyrate:

| Product | Total amount of cholesterol, g./l. of serum | Difference between averages | Amount of decrease TD, percent |
|---|---|---|---|
| Absolute control tests (gum water) | 0.65 (0.56–0.71) | | |
| Product of the invention: | | | |
| 100 mg./kg | 0.56 (0.48–0.61) | 0.09+ | 14 |
| 400 mg./kg | 0.50 (0.41–0.56) | 0.15++ | 23 |

(d) 3 - (ethoxycarbonyl)-propyl 4' - bromo-phenoxy-isobutyrate:

| Product | Total amount of cholesterol, g./l. of serum | Difference between averages | Amount of decrease TD, percent |
|---|---|---|---|
| Absolute control tests (gum water) | 0.59 (0.49–0.73) | | |
| Product of the invention: | | | |
| 100 mg./kg | 0.56 (0.48–0.70) | 0.03 | 5 |
| 400 mg./kg | 0.45 (0.34–0.55) | 0.14++ | 24 |

(e) 3-dimethylaminocarbonyl)-propyl 4' - chloro-pheoxy-isobutyrate: This product was tested as before (a week of treatment) and also after two weeks of treatment.

TREATMENT FOR ONE WEEK

| Product | Total amount of cholesterol, g./l. of serum | Difference between averages, $\overline{X}TE-\overline{X}TR$ | Amount of decrease TD, percent equals $\dfrac{\overline{X}TE-\overline{X}TR}{\overline{X}TE} \times 100$ |
|---|---|---|---|
| Absolute control tests (gum water) | 0.74 (0.61–0.87) | | |
| Product of the invention: | | | |
| 100 mg./kg | 0.65 (0.56–0.77) | 0.09+ | 12 |
| 400 mg./kg | 0.57 (0.50–0.70) | 0.17++ | 23 |

TREATMENT FOR TWO WEEKS

| Product | Total amount of cholesterol, g./l. of serum | Difference between averages, $\overline{X}TE-\overline{X}TR$ | Amount of decrease TD, percent equals $\dfrac{\overline{X}TE-\overline{X}TR}{\overline{X}TE} \times 100$ |
|---|---|---|---|
| Absolute control tests (gum water) | 0.65 (0.46–0.75) | | |
| Product of the invention: | | | |
| 100 mg./kg | 0.52 (0.43–0.60) | 0.13++ | 20 |
| 400 mg./kg | 0.46 (0.29–0.63) | 0.19++ | 29 |

The preceding results show that the products according to the invention possess a significant or highly significant activity at 100 or 400 mg. per kg. of animal weight taken orally.

THERAPEUTIC APPLICATION

The products are administered, for example, in the form of sugar-coated or gelatin-coated pills, each containing 200 mg. of active material, at a daily dose of 2 to 10 pills to patients suffering from a hypercholesterolemia.

We claim:
1. The 3-(N-isopropyl-carbamoyl)-propyl 4' - chlorophenoxy-isobutyrate.
2. The 3-(benzyloxycarbonyl)-propyl 4' - chloro-phenoxy-isobutyrate.
3. The 3-(ethoxycarbonyl)-propyl 4'-bromo - phenoxy-isobutyrate.
4. The 3-(dimethylaminocarbonyl)-propyl 4' - chlorophenoxy-isobutyrate.

References Cited

UNITED STATES PATENTS 2,818,424   12/1957   Zeile et al. _____ 260—427 G

OTHER REFERENCES

Brewster et al.: "Organic Chemistry," Prentice-Hall, Inc. (1961), p. 229.

Melandri et al.: Bull. Chem. Farm., 103, 475–489 (1964).

LORRAINE A. WEINBERGER, Primary Examiner

J. F. TERAPANE, Assistant Examiner

U.S. Cl. X.R.

260—247.2 A, 293.76, 326.3; 424—248, 267, 274, 308